(12) United States Patent
Criddle et al.

(10) Patent No.: US 9,598,274 B1
(45) Date of Patent: Mar. 21, 2017

(54) FUEL DISTRIBUTION SYSTEM AND METHOD

(71) Applicants: Anthony Wayne Criddle, Federal Way, WA (US); Matthew Reed Fairbanks, Renton, WA (US)

(72) Inventors: Anthony Wayne Criddle, Federal Way, WA (US); Matthew Reed Fairbanks, Renton, WA (US)

(73) Assignee: CONRAC Solutions, LLC, Anchorage, AK (US)

( * ) Notice: Subject to any disclaimer, the term of this patent is extended or adjusted under 35 U.S.C. 154(b) by 390 days.

(21) Appl. No.: 14/278,185

(22) Filed: May 15, 2014

Related U.S. Application Data

(60) Provisional application No. 61/824,984, filed on May 17, 2013.

(51) Int. Cl.
*B67D 7/08* (2010.01)
*B67D 7/22* (2010.01)
*B67D 7/34* (2010.01)

(52) U.S. Cl.
CPC .............. *B67D 7/08* (2013.01); *B67D 7/224* (2013.01); *B67D 7/34* (2013.01)

(58) Field of Classification Search
CPC . B67D 7/34; B67D 7/348; B67D 7/08; B67D 7/064; G07F 13/025; G07F 15/08
USPC ...................................... 141/94, 98; 700/232
See application file for complete search history.

(56) References Cited

U.S. PATENT DOCUMENTS

| | | | | |
|---|---|---|---|---|
| 6,157,871 | A * | 12/2000 | Terranova | B67D 7/067 141/94 |
| 8,185,449 | B2 | 5/2012 | Ward | |
| 8,346,616 | B2 | 1/2013 | Hwang | |
| 2004/0044497 | A1* | 3/2004 | Rogers | B67D 7/08 702/156 |

FOREIGN PATENT DOCUMENTS

EP  1 024 463 A2  8/2000

* cited by examiner

*Primary Examiner* — Timothy L Maust
*Assistant Examiner* — Timothy P Kelly
(74) *Attorney, Agent, or Firm* — Stoel Rives LLP

(57) ABSTRACT

A system and method for distributing fuel, managing fuel transactions, and determining fuel pricing. The system includes a fuel tank and dispensing systems connected thereto for serving customers. The dispensing systems include a meter measuring a volume of dispensed fuel and a data subsystem that transmits transaction data for fueling transactions completed during a first period. A tank gauge measures an ending volume of fuel at the end of the first period. A management system uses the transaction data to generate a usage report and invoice for the customers based on fuel usage during the first period. The management system further monitors the gauge and determines a price for the ending volume of fuel and a variance based on the measured ending volume of fuel and an expected volume. The variance is used to determine a second price for fueling transactions completed during a second period following the first period.

8 Claims, 3 Drawing Sheets

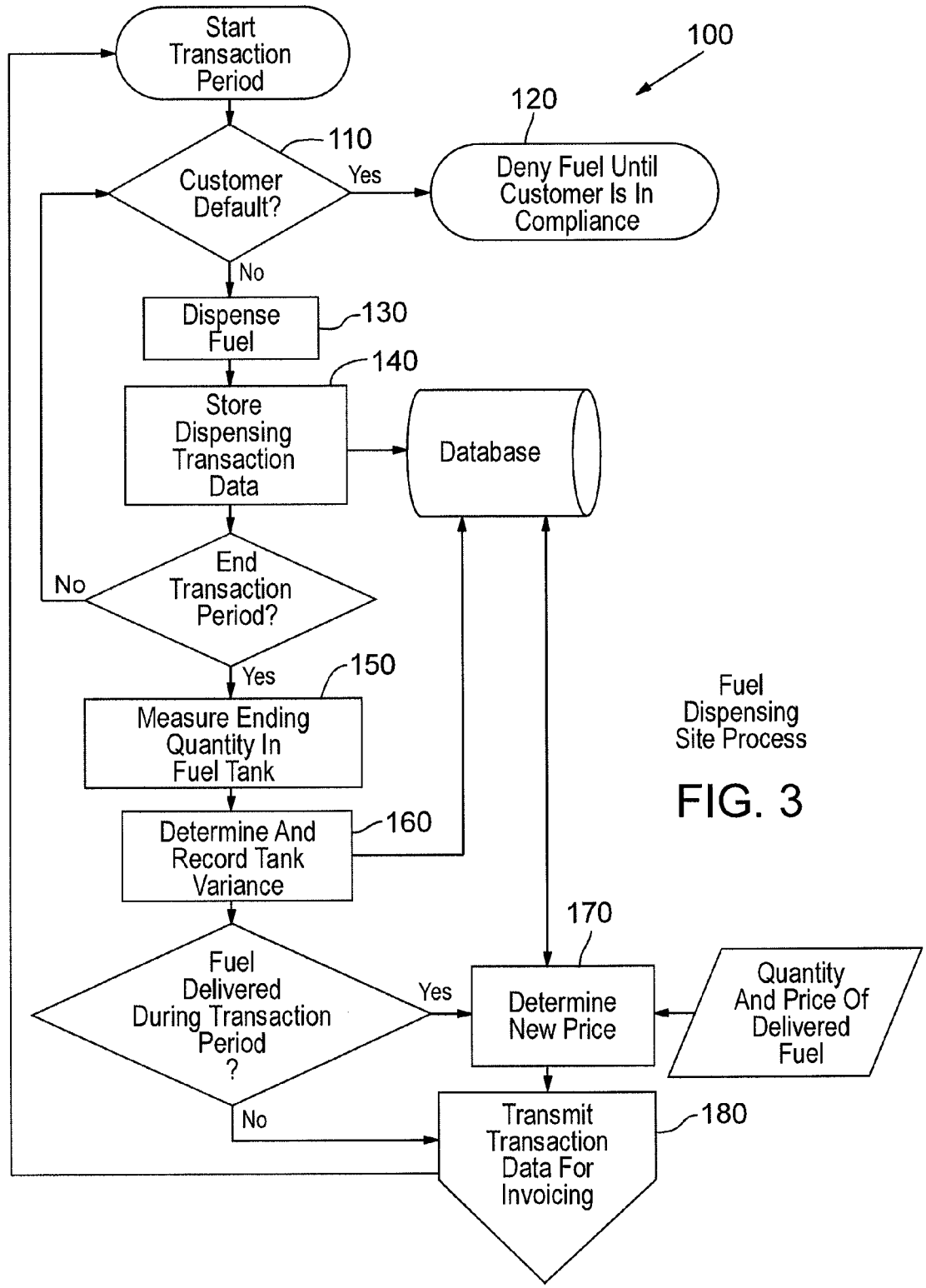

FUEL DISTRIBUTION SYSTEM AND METHOD

RELATED APPLICATION DATA

This application is a nonprovisional of and claims the benefit under 35 U.S.C. §119(e) of U.S. Provisional Patent Application No. 61/824,984, filed May 17, 2013, the disclosure of which is incorporated by reference herein in its entirety.

TECHNICAL FIELD

The field of the present disclosure relates to commodity distribution systems and methods, and particularly to fuel distribution and dispensing systems and related methods. Such systems and methods are particularly useful for refueling facilities shared by a relatively small number of high-volume customers, such as rental car agencies operating out of a consolidated quick turn-around (QTA) facility either as a part of a consolidated rent-a-car (CONRAC) complex, or with only QTA functions (such as washing, vacuuming, re-fueling, and preparing recently returned rental vehicles for re-rental) being consolidated.

BACKGROUND

There are several approaches to fuel distribution in widespread use. In retail distribution, a retail fueling station purchases fuel at a wholesale price or contract price for delivery to on-site tanks, but sells fuel to retail customers at a retail market price. As wholesale spot prices and retail market prices rise, a retail fuel station will generally raise its prices, even if the fuel in its storage tanks was purchased at a much lower price. Conversely, when wholesale spot prices fall, retail fueling stations will typically only lower their prices as necessary to avoid losing business to lower priced local alternatives, rather than passing along savings to customers.

Fleet distribution systems utilize a tank or tank farm and dispensing pumps that are shared by fleet vehicles. Fuel is typically purchased from distributors or wholesalers under a contract pricing arrangement or at the time of delivery, and dispensed as needed by fleet vehicles via shared dispensing stations. Cost allocation is sometimes performed on a first-in, first-out basis. The carrying costs and risk of the purchased fuel are borne by the fleet fueling operator, whereas contract pricing arrangements may shift some risk of unpredictable price fluctuation to the fuel provider.

Other distribution approaches and pricing models are employed by government agencies, municipalities, and other entities operating fleet vehicles or serving one or a few high-volume customers.

Many airports have or are planning to build consolidated QTAs, whether part of rental agency complexes (CONRACs) at which rental car agencies operate in a shared facility, sometimes a walkable distance from the main terminal, and sometimes further away, but accessed by a common transportation system, or to consolidate only QTA functions. CONRAC facilities may provide many benefits including reduced traffic, decreased pollution, and improved operational efficiencies. Consolidated QTA facilities may provide more efficient land use, environmental benefits, and cost and operational efficiencies. A CONRAC or QTA facility may be operated by the host airport, but is more typically operated by a facility manager or site manager who is responsible for the maintenance and operation of common facilities and certain core operations, such as car washes, and fuel storage and dispensing systems, for example. Alternatively, the fuel storage and dispensing system may be managed by a separate fuel manager. As used in the specification, the term "fuel manager" encompasses any person or entity responsible for managing the fuel storage and distribution system, system at a CONRAC or QTA facility, whether the same as or different from the site manager.

The present inventors have recognized that the carrying costs and risk of ownership associated with stored fuel are undesirable even for businesses that need fuel immediately available, and have devised improved systems and methods of storage, distribution and delivery that reduce such costs and risks for both the fuel distributor and the customers. As will be recognized in view of the following disclosure, such methods have particular utility in CONRACs and QTAs due to one or more aspects of such facilities, including the relatively small number of rental agencies in occupancy and needing fuel at each facility, high fuel requirements of those rental agencies, and consolidated or complex fuel storage and supply systems and equipment. Typically, neither car rental customers nor the general public have access to CONRAC or QTA fueling facilities. Managers of CONRAC and QTA facilities also have the ability to contract with fuel distribution companies and perhaps even fuel wholesalers to obtain low prices.

BRIEF DESCRIPTION OF THE DRAWINGS

FIG. 3 is a flow chart depicting a method of operating a fuel dispensing system.

DETAILED DESCRIPTION OF PREFERRED EMBODIMENTS

With reference to the drawings, this section describes particular embodiments and their construction and operation. Throughout the specification, reference to "one embodiment," "an embodiment," or "some embodiments" means that a particular described feature, structure, or characteristic may be included in at least one embodiment. Thus appearances of the phrases "in one embodiment," "in an embodiment," or "in some embodiments" in various places throughout this specification are not necessarily all referring to the same embodiment. Furthermore, the described features, structures, characteristics, and methods of operation may be combined in any suitable manner in one or more embodiments. In view of the disclosure herein, persons skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

For example, the following detailed disclosure describes embodiments of systems and methods for distributing liquid fuel such as gasoline, diesel fuel, or oil. However, it should be understood that systems and methods consistent with the present disclosure may be utilized for distribution of other fuels, such as solid fuels, gaseous fuels, or compressed gaseous fuels, or other commodity products in various forms or physical states.

Figure 1:
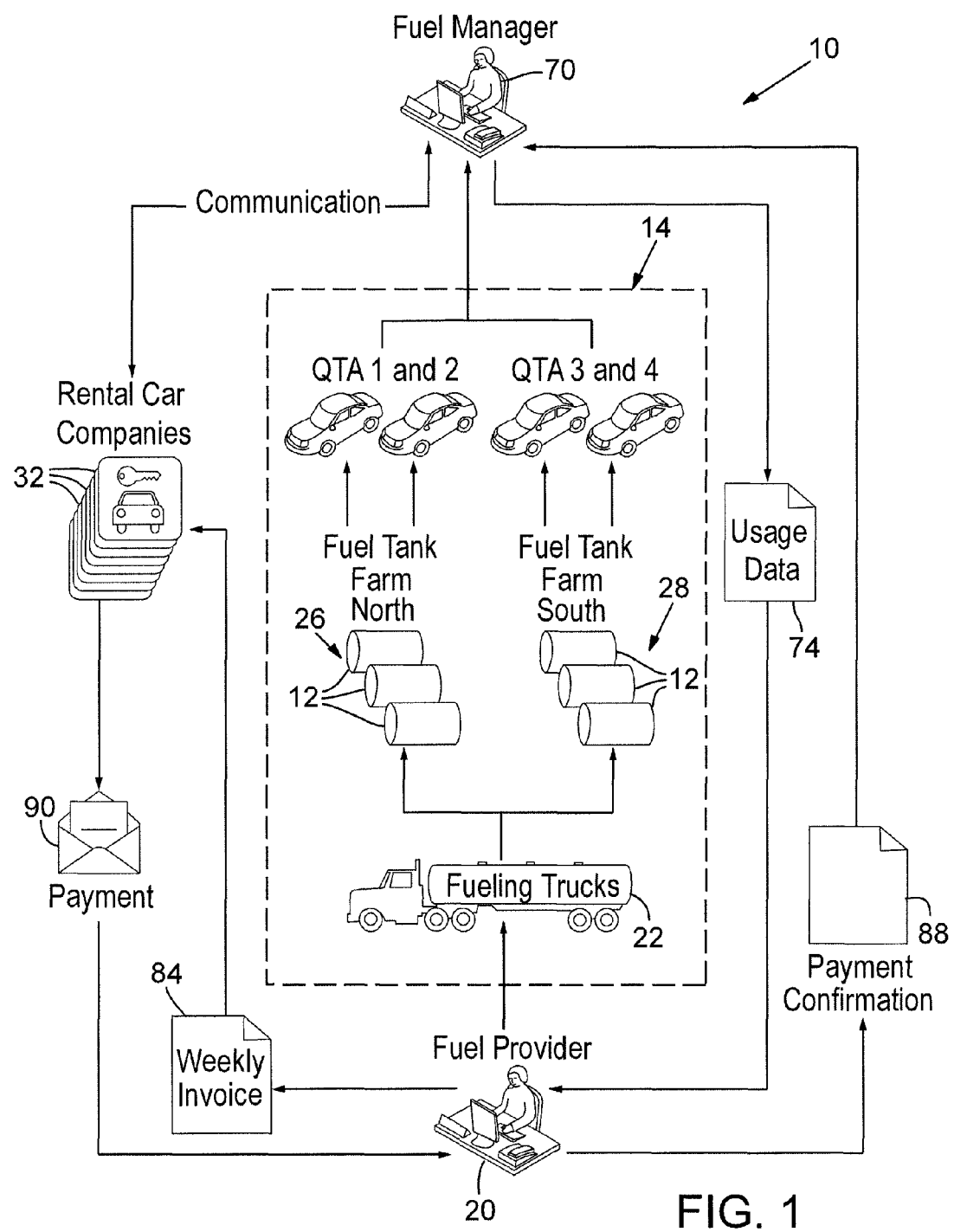
FIG. 1 is a block diagram of a fuel storage and distribution system.

FIG. 1 is a schematic block diagram illustrating a fuel distribution system 10 in accordance with a preferred embodiment. With reference to FIG. 1, fuel distribution system 10 comprises one or more fuel storage tanks 12 located underground or above ground on site at a CONRAC facility 14. Tanks 12 are accessible to a fuel provider 20 for delivering fuel thereto—generally via tanker trucks 22. In other embodiments, fuel may instead be delivered via pipeline. In the illustrated embodiment, the tanks 12 of CONRAC 14 are arranged into two separate tank farms—a first tank farm 26 serving refueling stations located within a first designated portion of the CONRAC 14 and a second tank farm 28 serving refueling stations located within a second designated portion of the CONRAC 14. For example, in one embodiment, the CONRAC 14 may be divided into a northern region and a southern region, and the first tank farm 26 may serve the northern region of the CONRAC 14 and the second tank farm 28 may serve a southern region of the CONRAC 14. In other embodiments, a greater or lesser number of tanks may be utilized and positioned in any number of configurations, with or without piped connections that enable transfer of fuel from one tank to another.

Fuel distribution system 10 includes one or more fuel dispensing systems 30 (FIG. 2) connected to each of the storage tank farms 26, 28. Dispensing systems 30, which may include fuel dispensing pumps/nozzles, serve the refueling needs of fuel customers 32 (e.g., multiple rental car agencies) operating out of the CONRAC 14 and utilizing one or more QTAs (QTA 1, QTA 2, QTA 3, and QTA 4). It should be understood that throughout the specification, reference to "fuel customer(s)" means car rental agencies that require fuel for their own and their car rental customers' use, and without regard to the point (e.g. pre-delivery, at delivery, during storage or at dispensing) at which such car rental agency purchases the fuel. Furthermore, "car" means any motorized of self-propelled vehicle that may be rented or leased. In some cases, one or more of the dispensing pumps at a QTA is dedicated to a single rental car agency (single fuel customer), in which case fuel dispensed at such pumps may be attributed to the assigned fuel customer. In other cases, a single dispensing pump or group of pumps may serve multiple fuel customers. Shared pumps may include an access control module 34, such as a keypad or cardlock mechanism requiring a personal identification number (PIN), a password or key card to activate the pump. Unique PINs, keycards, or passwords for each fuel customer, or even each employee of each fuel customer facilitate fuel usage accounting on a customer-by-customer basis.

Figure 2:
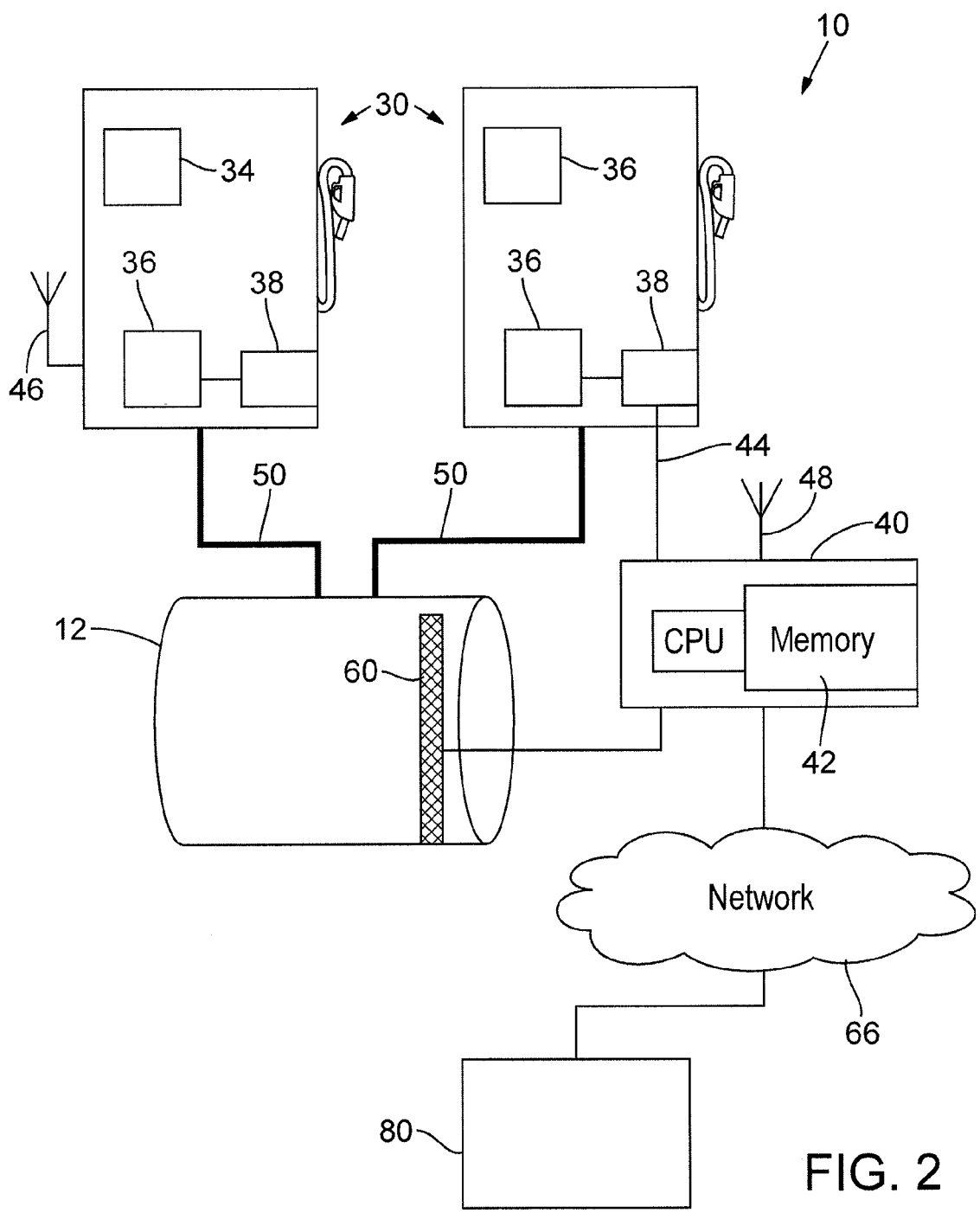
FIG. 2 is a schematic diagram illustrating a fuel dispensing system of the fuel storage and distribution system of FIG. 1 and its connections to other components of the fuel storage and distribution system.

As illustrated schematically in FIG. 2, each of the fuel dispensing systems 30 preferably includes a meter 36 for measuring a volume of fuel dispensed during each physical dispensing of fuel into a vehicle (referred to throughout the specification as a "transaction," "fueling transaction," or "fuel dispensing transaction," regardless whether or when ownership of the fuel changes or sale of the fuel occurs), and a data communication subsystem 38 in communication with the meter 36. The fuel dispensing systems 30 and the data communication subsystem 38 each include computer components for running software or other computer instructions, such as one or more programmable microprocessors (not shown), computer readable storage medium or memory (not shown), communications systems, and other logic/circuitry, to carry out various operations as further described below. In some embodiments, the fuel dispensing systems 30 and the data communications subsystem 38 may share one or more of these computer components.

The data communication subsystems 38 are programmed to transmit transaction data for each fuel dispensing transaction completed at each pump to a site management system 40 or other data processing system including a computer readable storage medium such as memory 42. Site management system 40 may include a general purpose programmable computer running a software program stored in a computer-readable medium, such as register memory, processor cache, and Random Access Memory (RAM). The site management system 40 is designed to interface with fuel pumps, tank gauges, and other like equipment, to log transaction data, and to allow remote monitoring and data access. Site management system 40 may be used to manage all or a portion of the fuel distribution system 10 at the CONRAC site, or may be a central system for multiple geographically dispersed sites.

With reference to FIG. 2, in some embodiments, transaction data may be transmitted from the data communication subsystems 38 (or the fuel dispensing system 30) to the site management system 40 via a hard-wired connection or a wireless connection. For example, in a hard-wired connection, data may be transmitted over wires 44 connecting data communication subsystems 30 with the site management system 40. In other embodiments, transaction data may be transmitted from the data communication subsystems 30 to the site management system 40 wirelessly via a radio-frequency transmitter/receiver pair 46, 48 connect via a data transmission network, or otherwise. Fueling transaction data may include data representing a measure of the volume of fuel dispensed during a fueling transaction, as measured by the meter 36, and data representing the identity of the customer receiving the dispensed fuel. Other transaction data, such as a time stamp, employee ID, vehicle ID, and site ID may also be included in some embodiments. In a facility in which each of the dispensing systems 30 is dedicated to a particular fuel customer, the data representing the identity of the fuel customer may merely be a pump ID number or code that is resolved by reference to a stored table of pump assignments. In one alternative embodiment (not illustrated), the meter 36 of fuel dispensing systems 30 may be hard-wired to a data logging system, and data communication subsystem 38 may be omitted. In still other embodiments (not shown), the fuel dispensing systems 30 may include onboard memory for storing transaction data for a relatively long period of time, such as weeks or months, which may then be accessed on-demand directly by a remote accounting system operated by the fuel provider or a billing agent.

Fuel dispensing systems 30 are connected to a tank 12 or tank farm 26, 28, and draw fuel therefrom via pipes, hoses, or other conduits 50. Each of the fuel storage tanks 12 or tank farms 26, 28, is equipped with a gauge 60 for measuring the volume of fuel in the storage tank. Gauge 60 may be coupled with site management system 40 or another data logging system for logging usage data and for making current tank level data available over a data network 66 (e.g., the Internet or other network) to key personnel, such as a fueling manager 70 (FIG. 1), the fuel provider 20, and others. In some embodiments, a suitable gauge may be a model TLS-350 or TLS-450 automatic tank gauge made by Veeder-Root Company of Simsbury, Conn. The Veeder-Root gauge and monitoring system also enables alerts to be generated and sent to the fuel vendor and/or the fuel manager and/or the site manager in the event that the tank levels drop below a predetermined threshold, indicating the need for a fuel delivery.

Site management system 40 preferably receives the transaction data for multiple fueling transactions completed via the fuel dispensing systems 30 by multiple fuel dispensing customers 32, and accesses a machine-readable storage medium (memory 42 or other) to store multiple fueling transaction records representing the fuel dispensing transactions. Each fueling transaction record includes at least the measure of the volume of dispensed fuel measured by meter 36 and the identity of the dispensing customer receiving the dispensed fuel (which as noted above may be in the form of a pump ID). In one embodiment, wherein the fuel in the storage tanks 12 remains owned by the fuel distributor until dispensed, the site management system 40 is operable by the fuel manager 70 to periodically transmit to the fuel provider 20 a usage report 74 (FIG. 1) including the volume of fuel dispensed and the identity of the fuel customer dispensing the fuel. In some embodiments, the usage report 74 may be generated for each transaction occurring within a specific period of time (e.g., daily or weekly) or may simply include all transactions occurring since a preceding usage report was generated. The fuel provider 20 then utilizes the usage report(s) 74 to send invoices directly to the dispensing customers and collect payment for the fuel dispensed. In another embodiment (not illustrated), fuel held in the storage tanks 12 is initially purchased by the fuel manager 70 or by the dispensing customers collectively, and the site management system 40 is operable to periodically generate usage reports 74 that may be used for cost accounting purposes by fuel manager 70, a site manager, or other accounting or billing administrator to allocate the cost of dispensed fuel to the dispensing customers 32.

In some embodiments, the site management system 40 is operable by the fuel manager 70 to interface with the access control module 34 of at least one of the dispensing systems 30 to deny dispenser operation and fuel to any fuel customers 32 in default of fuel payment or other obligations. The site management system 40 may communicate with the gauge 60 to determine an ending volume of fuel in tank 12 at the end of a transaction measurement or accounting period—for example at the end of each day. Site management system 40 may further determine a variance based on the difference between the measured ending volume ($V_{end}$) and an expected ending volume ($V_{expected}$), wherein $V_{expected}$ is the sum of a beginning volume ($V_1$) of fuel present in the storage tank 12 at the beginning of the transaction measurement or accounting period and a volume of fuel delivered to the storage tank 12 ($V_{deliv}$) during the transaction measurement or accounting period, less the sum of the measures of dispensed fuel for the fueling transactions completed during the transaction measurement or accounting period ($\Sigma(V_{trans})$), expressed formulaically as:

$$\text{Variance} = V_{end} - (V_1 + V_{deliv} - \Sigma(V_{trans}))$$

The site management system 40 may also store the variance in memory 42 or another computer readable storage medium, as further described below with reference to FIG. 3.

With reference to FIGS. 1 and 2, fuel distribution system 10 may further include an accounting subsystem or billing subsystem 80 operated by the fuel provider 20, by the fuel manager 70, by a third-party billing administrator, accounting administrator or another party. The billing subsystem 80 may include a general purpose programmable computer running one or more software programs stored in a computer-readable medium, such as register memory, processor cache, and Random Access Memory (RAM), the software programs being operable for generating or creating billing invoices. In the embodiment illustrated, the billing subsystem 80 receives the usage report 74 from site management system 40 and, based on the usage report 74, generates invoices 84 that may be delivered to each of the fuel customers 32 on a regular basis, such as daily, weekly, or monthly. The billing subsystem 80 transmits a payment confirmation 88 to the fueling manager 70 in response to receipt of payment 90 by fuel provider 20. Terms of payment may be negotiated by the fueling manager 70 on behalf of the fuel customers 32, but desirably the contract for fuel and the invoices and payment are directly between the fuel provider 20 and fuel customers 32, which will help to reduce administrative burdens on the fueling manager 70, to provide prompt payment to the fuel provider 20, and to shelter the fueling manager 70 from assuming any risk of fuel customer non-payment.

Turning to FIG. 3, the fuel distribution system 10 of FIGS. 1 and 2 embodies a fuel distribution method 100 illustrated in the flowchart of FIG. 3. Method 100 entails distributing fuel via a plurality of fuel dispensing transactions during each of a series of transaction measurement or accounting periods, including at least sequential first and second transaction measurement or accounting periods. During a first transaction measurement or accounting period, each of multiple fuel customers 32 is provided access to at least one of the multiple dispensing systems 30 (FIG. 2) connected to a shared (common-use) fuel storage tank 12 for dispensing fuel therefrom. The storage tank 12 contains a beginning volume of fuel at the beginning of the first transaction measurement or accounting period, and the fuel dispensed during the first transaction measurement or accounting period has a predetermined first price per unit volume.

With particular reference to FIG. 3, at step 110, a fuel dispensing customer 32 attempts to start fueling a vehicle via one of the dispensing systems 30. In some embodiments, prior to dispensing fuel, the dispensing system 30 may require input of identification information for the fuel dispensing customer 32, which may be used to authorize the fueling transaction via site management system 40 or some other means or mechanism for authorization in system 10. In other embodiments, one or more dispensing systems 30 may be assigned to particular fueling customers 32, so identification information may not be needed.

If the fueling dispensing transaction is not authorized, perhaps because the fuel customer 32 is in default of its payment obligations or other obligations, then fueling manager 70 may operate site management system 40 or some other component of system 10 to deny fuel to the fuel dispensing customer (step 120) until the default is cured. In other embodiments, site management system 40 or other component of system 10 may automatically deny (e.g., without any input required by the fueling manager 70 or other party) the fueling dispensing transaction when it is not authorized for any reason. If the fuel dispensing customer 32 is current in its payments and/or otherwise not in default, system 10 authorizes dispensing system 30 to dispense fuel (at step 130) in a fuel dispensing transaction. Alternatively, in the event of a fuel dispensing customer default reported to fueling manager 70 by fuel provider 20, the fueling manager 70 may manually lock the dispensing systems 30 associated with a particular customer via a key lock, shut-off switch, or other means.

If fueling is authorized, at step 140, system 10 stores transaction data in a computer readable storage medium, which may be memory 42 associated with site management system 40 or some other storage medium, such as cloud storage or other network accessible storage. This transaction data storage continues for each transaction during the transaction measurement or accounting period. The transaction data may be accumulated in the computer readable storage medium for the entire transaction measurement or accounting period before it is sent to or uploaded by the fuel provider 20 or a billing agent. Alternatively, the transaction data may be sent to or uploaded by the fuel provider or billing agent periodically during and after the transaction measurement or accounting period.

At the end of the transaction measurement or accounting period, at step 150, an ending quantity of fuel is measured in tank 12 using gauge 60. Due to shrinkage and other factors, the measured ending quantity of fuel in tank 12 may be different from the expected end quantity of fuel, wherein the expected ending quantity is the beginning volume of fuel in the tank, plus any fuel delivered during the transaction measurement or accounting period, less the sum of the measured volumes of fuel dispensed during the refueling transactions. Fuel variance may be determined and recorded at step 160 after the end of each transaction measurement or accounting period. In some embodiments, the variance may be recorded as a special transaction having a dollar value. For example, if the measured volume of fuel as of the end of a transaction measurement or accounting period is greater than the expected end volume, then the variance may be reflected as a negative fuel transaction, which is in essence a credit to the total value of fuel in tank 12. Conversely, if the measured ending volume of fuel is less than the expected end volume, the variance may be reflected as a positive transaction (as in a dispensing transaction), which is in essence a debit to the total value of fuel in tank 12. The variances may be stored in a computer readable storage system until the end of a reconciliation period including the first and second transaction measurement or accounting periods (for example at the end of the month), then totaled to determine an adjustment to the value of fuel in the tank and the attendant price per unit volume for future transactions.

If fuel has been delivered by a fuel provider to the storage tank during the transaction measurement or accounting period, then a new price for the fuel is determined after the end of the transaction measurement or accounting period, at step 170. The new price will then be applied to fuel transactions concluding during the subsequent transaction measurement or accounting sub-period. The new price may be determined as a weighted average of the cost of the delivered fuel and the remaining fuel from the end of the previous transaction measurement or accounting sub-period, less any transactions during the current transaction measurement or accounting period. For example, a weighted average price may be expressed as:

$$((V_{end} - V_{deliv}) \times P_1)(V_{deliv} \times P_{deliv}))/V_{end} = \text{New Price}$$

Wherein $V_{end}$ is the measured ending volume of fuel in the tank at the end of the transaction measurement or accounting period, $V_{deliv}$ is the volume of fuel delivered during the transaction measurement or accounting period, which may be reflected in a bill of lading, $P_1$ is a previous price (applied during the transaction measurement or accounting period), $P_{deliv}$ is i the cost of the delivered fuel on a per-gallon basis.

$P_{deliv}$ may preferably be determined under a contract arrangement between fuel manager 70 and fuel provider 20 as a function of a fuel index price on the date of delivery to the storage tank. Setting the delivered price as a function of a fuel index price incentivizes the fuel provider 20 to find a low cost source of fuel and sets the price close to or in some cases below an estimate of the prevailing wholesale price for fuel on the date of delivery. By calculating the new price daily as a weighted average—taking into account the value of fuel remaining in the tank and the cost of delivered fuel, and taking into account shrinkage, as reflected in the variances applied to the pricing on a less frequent basis—the fuel provider 20 is assured to recoup the cost of the fuel and bears no risk of price fluctuations, allowing the fuel provider to provide a predictably low price for delivered fuel relative to index prices and allowing customers to realize savings without complicated futures contracts and hedging.

Transaction data, and optionally the new price information, may be transmitted to the fuel provider 20, accounting subsystem, or billing subsystem 80 at step 180, and the process is repeated for the next transaction measurement or accounting period, at the new price.

For a facility such as CONRAC 14 having multiple separate tanks (tank farms 26, 28), it may be desirable to set and maintain uniform pricing across the entire site for all customers during a transaction measurement or accounting period, regardless of usage from a particular one of the separate tanks or tank farms. This is easily done, for each transaction measurement or accounting period, by aggregating the ending volume measurements, fuel deliveries, and dispensing transactions for all tanks and all dispensing systems at the site. If the price per unit volume changes in a subsequent transaction period, the pricing may be updated as necessary and set for the subsequent transaction period.

Promptly reporting the transaction data to the fuel provider 20—either during or at the end of a transaction measurement or accounting period, on a daily basis or more frequently—facilitates payment of taxes on dispensed fuel (which must be reported daily). Taxes are added by fuel provider 20 to the transaction prices on weekly invoices 84 sent to customers 32, but preferably do not affect the new price calculations—as a weighted average cost of the fuel in tanks 12, or otherwise—for subsequent transaction measurement or accounting periods.

It will be obvious to those having skill in the art that many changes may be made to the details of the above-described embodiments without departing from the underlying principles of the invention. The scope of the present invention should, therefore, be determined only by the following claims.

The invention claimed is:

1. A fuel distribution system, comprising:
a fuel storage tank accessible to a fuel provider for delivering fuel thereto;
multiple fuel dispensing systems connected to the storage tank for serving multiple dispensing customers, each of the fuel dispensing systems including a meter measuring a volume of dispensed fuel and a data communication subsystem in communication with the meter, the data communication subsystem transmitting transaction data for each of a plurality of fuel dispensing transactions completed during a first period, the transaction data including data representing a measure of the volume of dispensed fuel measured by the meter and data representing an identity of a dispensing customer receiving the dispensed fuel;
a gauge associated with the storage tank, the gauge measuring an ending volume of fuel in the storage tank at the end of the first period; and
a site management system in communication with the fuel dispensing systems and the gauge, the site management system receiving the transaction data for multiple fueling transactions completed via the fuel dispensing systems by multiple dispensing customers, the site management system accessing a machine readable storage medium to store multiple fueling transaction records representing the fuel dispensing transactions, each fueling transaction record including at least the measure of the volume of dispensed fuel and the identity of the dispensing customer receiving the dispensed fuel, the site management system programmed to produce a usage report including, for each fuel dispensing transaction occurring since a preceding usage report, the volume of fuel dispensed and the identity of the dispensing customer dispensing the fuel, the site management system programmed to interface with at least one of the multiple fuel dispensing systems to deny a defaulting one of the dispensing customers from obtaining fuel therefrom, the site management system communicating with the gauge and programmed to determine a price per unit volume of the ending volume of fuel and further programmed to determine a variance based on the difference between the ending volume and an expected ending volume, and record the variance in a computer readable storage medium, wherein the expected ending volume is the sum of a beginning volume of fuel present in the storage tank at the beginning of the first period and a volume of fuel delivered to the storage tank during the first period, less the sum of the measure of the volume of dispensed fuel for the fueling transactions completed during the first period.

2. The fuel distribution system of claim 1, further comprising:
a billing subsystem in communication with the site management system, the billing subsystem receiving the usage report and generating a billing invoice based on the usage report, the billing subsystem further delivering the billing invoice to each of the dispensing customers.

3. The fuel distribution system of claim 2, wherein the billing subsystem is further programmed to transmit payment confirmation information to one or both of the fuel provider and the site management system in response to receipt of payment.

4. The fuel distribution system of claim 2, wherein the billing subsystem is further programmed to determine tax owed based on the usage report, and include the tax on the billing invoice.

5. The fuel distribution system of claim 1, wherein the site management system monitors the gauge and notifies one or both of the fuel provider and a fuel manager when a volume of fuel remaining in the storage tank is below a predetermined threshold.

6. The fuel distribution system of claim 1, the data communication subsystem further programmed to transmit transaction data for each of a plurality of fuel dispensing transactions completed during a second period following the first period, the transaction data including data representing a measure of the volume of dispensed fuel measured by the meter and data representing an identity of a dispensing customer receiving the dispensed fuel during the second period, the site management system communication with the gauge and programmed to determine a second price per unit volume of the ending volume of fuel at an end of the second period, the site management system further programmed to determine a second variance based on the different between the ending volume of fuel at the end of the second period and an expected ending volume at the end of the second period, and record the second variance in the computer readable storage medium, wherein the expected ending volume at the end of the second period is the sum of a beginning volume of fuel present in the storage tank at a beginning of the second period and a volume of fuel delivered to the storage tank during the first period, less the sum of the measure of the volume of dispensed fuel for the fueling transactions completed during the first period.

7. The fuel distribution system of claim 6, wherein at an end of a reconciliation period including the first and second periods, the site management system is further programmed to determine an adjustment price per unit volume of the fuel then remaining in the storage tank, the adjusted price based on a cumulative variance during the reconciliation period including the first and second variances.

8. The fuel distribution method of claim 6, wherein the site management system maintains uniform pricing across each of the multiple dispensing systems during each of the first and second periods, wherein each fuel dispensing transaction completed during the first period is priced at a first price per unit volume, and each fuel dispensing transaction completed during the second period is priced at the second price per unit volume.

* * * * *